United States Patent [19]

Wirth et al.

[11] Patent Number: 5,003,797

[45] Date of Patent: Apr. 2, 1991

[54] LOCKOUT DEVICE FOR VALVES WITH LEVER HANDLES

[75] Inventors: Gary J. Wirth, Milwaukee; George F. Jambor, Cedarburg, both of Wis.

[73] Assignee: W. H. Brady Co., Milwaukee, Wis.

[21] Appl. No.: 557,872

[22] Filed: Jul. 25, 1990

[51] Int. Cl.⁵ ............................................. F16K 35/10
[52] U.S. Cl. ........................................ 70/180; 70/203; 70/212; 137/385
[58] Field of Search .................. 70/203, 163, 164, 166, 70/170, 212, 175–180; 137/385

[56] References Cited

U.S. PATENT DOCUMENTS

| | | | |
|---|---|---|---|
| 566,932 | 9/1896 | Patrick | 70/180 |
| 1,040,040 | 10/1912 | Shephard | 70/180 |
| 1,322,721 | 11/1919 | Noonan | 137/385 |
| 3,401,715 | 9/1968 | Johnson et al. | 137/385 |
| 3,865,130 | 2/1975 | Mullis | 70/203 X |
| 3,960,168 | 6/1976 | Plympton | 137/385 |
| 4,126,023 | 11/1978 | Smith et al. | 70/212 X |
| 4,498,320 | 2/1985 | Mullis | 70/212 X |
| 4,534,379 | 8/1985 | Burge | 70/180 X |

Primary Examiner—Lloyd A. Gall
Attorney, Agent, or Firm—Quarles & Brady

[57] ABSTRACT

A lockout device for a valve having a lever handle. The device includes a channel member defining a channel to receive a section of the lever handle when closed and a leg that bears against the valve or pipeline connected to it. A lock is inserted through the apertures in the channel member alongside an edge of the handle.

3 Claims, 4 Drawing Sheets

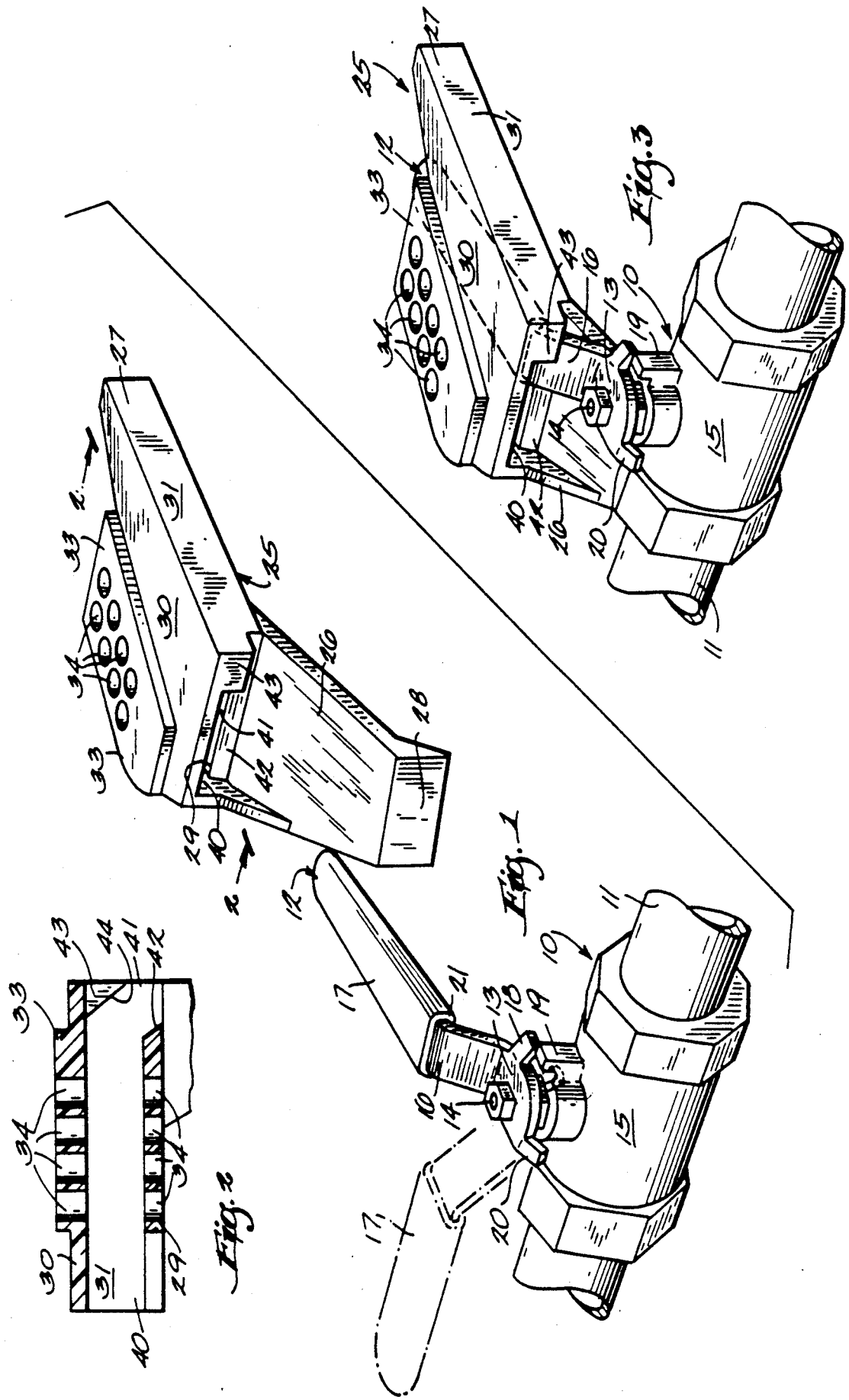

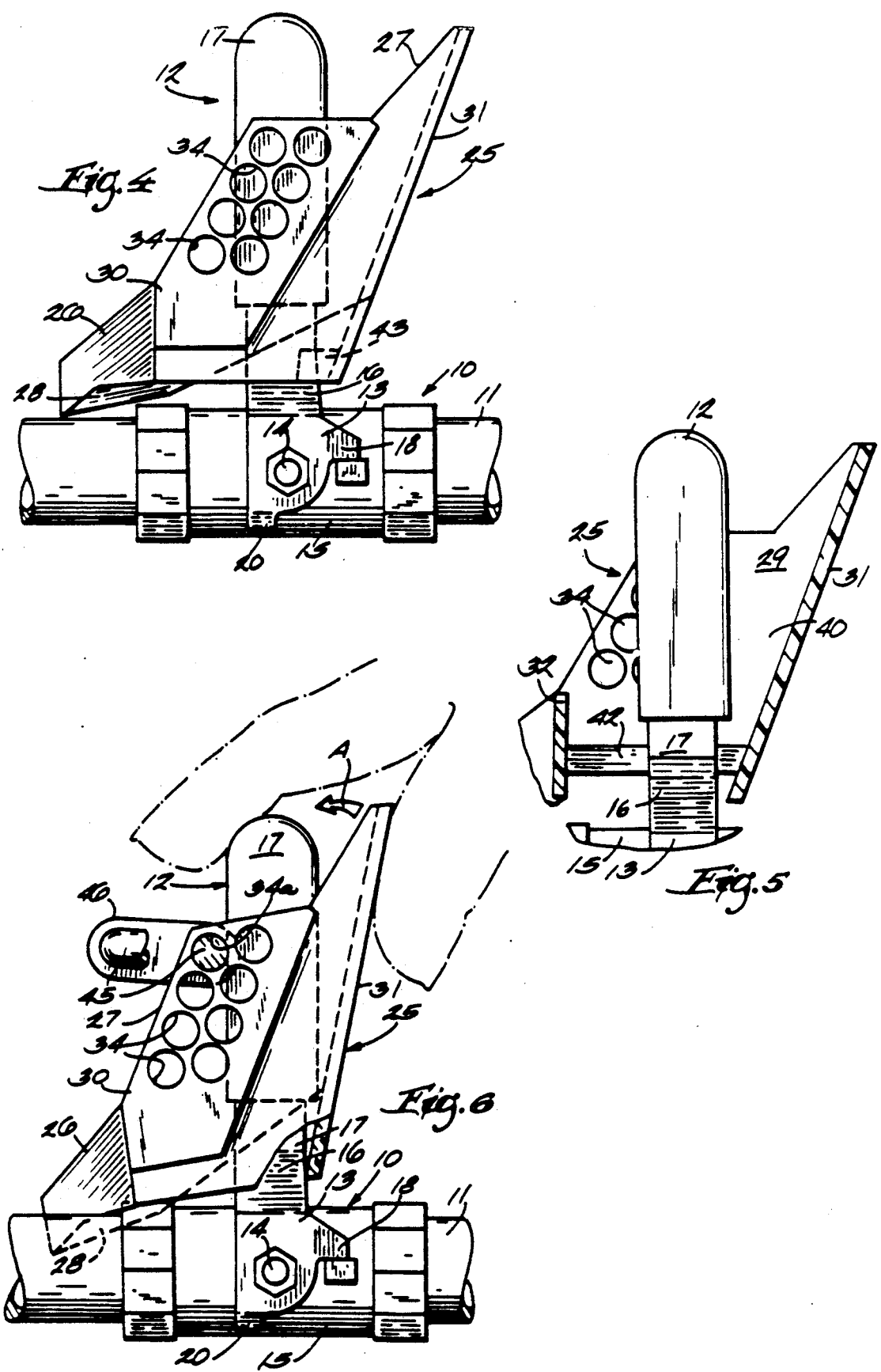

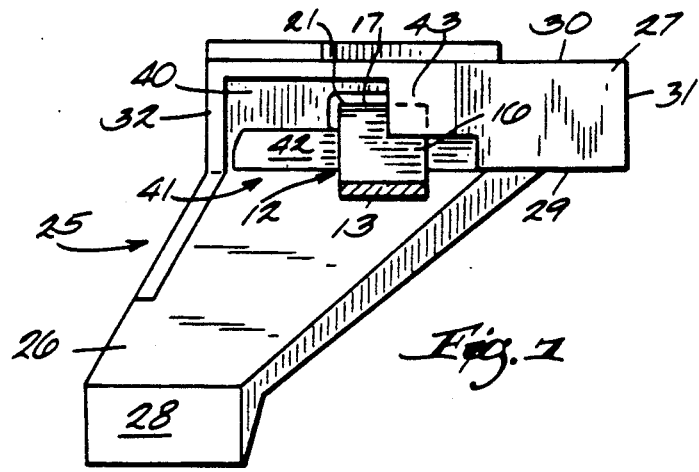
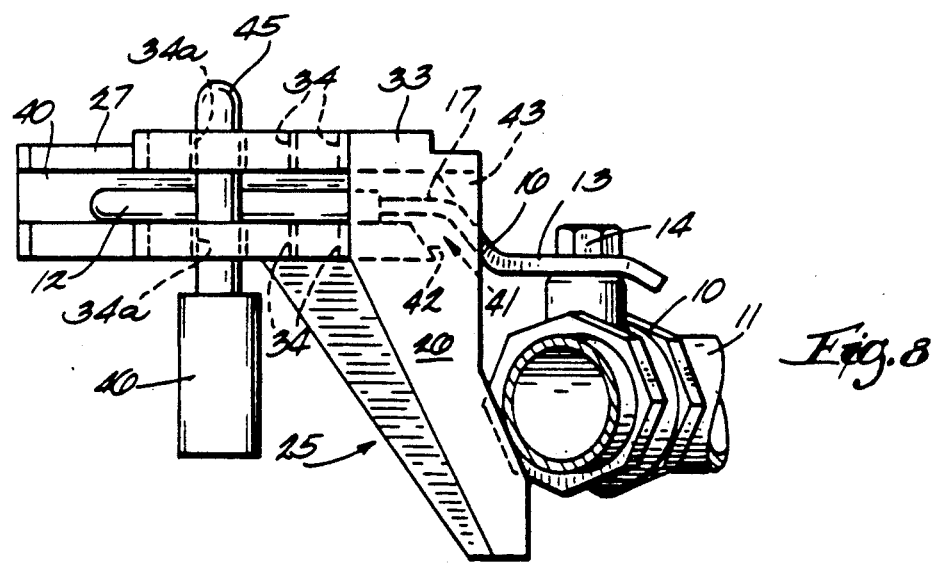
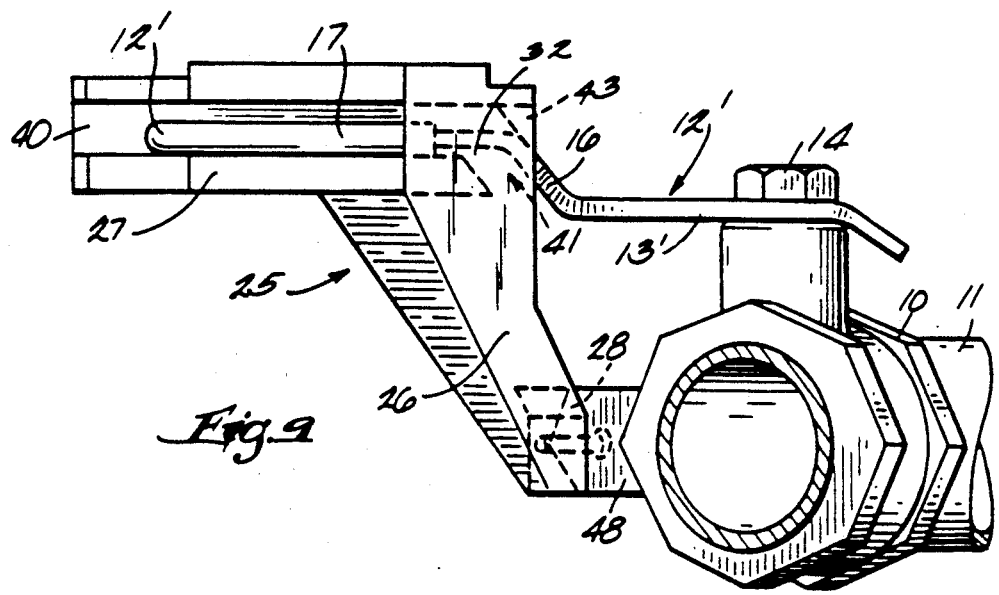

LOCKOUT DEVICE FOR VALVES WITH LEVER HANDLES

BACKGROUND OF THE INVENTION

The present invention relates to the field of lockout devices which are intended to lock the handle of a valve in its closed position; more specifically, the present invention relates to a lockout device for use with a valve of the type having a handle in the form of a lever.

The Occupational Safety and Health Administration (OSHA) recently issued a standard relating to safety requirements for the control of hazardous energy, 29 CFR §1910.147, effective as of Oct. 31, 1989, entitled Control of Hazardous Energy Sources (Lockout/Tagout). The standard establishes procedures to disable machinery or equipment and prevent the release of potentially hazardous energy while maintenance and servicing activities are performed. The standard requires, inter alia, that an energy source having a line valve that is capable of being locked out must be locked out to insure that equipment being controlled cannot be operated until the lockout device is removed. A lockout device is defined in the regulation as a positive means such as a lock to hold an energy isolating device in the safe position and prevent energizing of machinery or equipment. The regulation is applicable to any source of electrical, mechanical, hydraulic, pneumatic, chemical, thermal or other energy.

Many types of machinery and equipment have energy supplied by a fluid carried in a pipeline such as a hydraulic line, compressed air line, water line, etc. The pipeline will have a valve located near the machine that is used to shut off the flow of fluid to the machine when maintenance or service work is to be performed. One type of valve in general use as a shut off valve for fluid carrying pipelines has a handle in the form of a lever that can be moved between an open position for passage of fluid through the pipeline and a closed position to shut off the flow of fluid. The above OSHA regulation will now require that a lever type valve, when installed on a pipeline carrying an energy source to machinery or equipment, must include some form of device so that the valve can be locked in the closed position during maintenance or service.

New lever type valves are on the market at the present time that include a built-in lockout feature, and it is anticipated that new valves will have this feature when purchased. However, there are presently hundreds of thousands of lever type valves in service and it would be extremely expensive to retrofit pipelines with new valves having a built-in lockout feature. There is therefore a need for a lockout device that can be retrofitted to existing lever type valves, and the present invention was developed in response to this need.

SUMMARY OF THE INVENTION

The present invention provides a lockout device for use with a valve having a pivotable lever handle with an inclined intermediate panel, which device includes a leg having a surface that bears against the body of the valve or the pipeline on which the valve is installed and a channel member extending at an angle from the leg. The lever handle of the valve is inserted through the channel member of the lockout device, and the device is then pivoted to load the handle in a closed position, following which the hasp of a lock is inserted through an array of apertures in the channel member to lock the valve in the closed position.

DESCRIPTION OF THE DRAWINGS

The invention is described below in full and complete detail to enable its practice by those of ordinary skill in the art by reference to the following drawings, in which:

FIG. 1 is an exploded view illustrating a lever type valve and a lockout device of the invention in perspective;

FIG. 2 is a sectional view, with a portion broken away, along the plane of line 2—2 of FIG. 1;

FIG. 3 is a perspective view illustrating the lockout device installed on the lever handle of the valve when in its closed position;

FIG. 4 is a plan view illustrating the initial step in the installation of the lockout device on the handle of the valve;

FIG. 5 is a plan view, with portions broken away, further illustrating the step of FIG. 4;

FIG. 6 is a plan view, with portions broken away, illustrating the final step in applying the lockout device on the handle of the valve to hold it in the closed position;

FIG. 7 is a front view illustrating the lockout device with the lever handle of the valve shown in cross section when in the closed position;

FIG. 8 is a perspective view illustrating the lockout device installed on the valve handle in its closed position;

FIG. 9 is a perspective view illustrating a useful optional feature that can be employed with a lockout device of the present invention;

DESCRIPTION OF PRESENTLY-PREFERRED EMBODIMENTS

Figure 10:
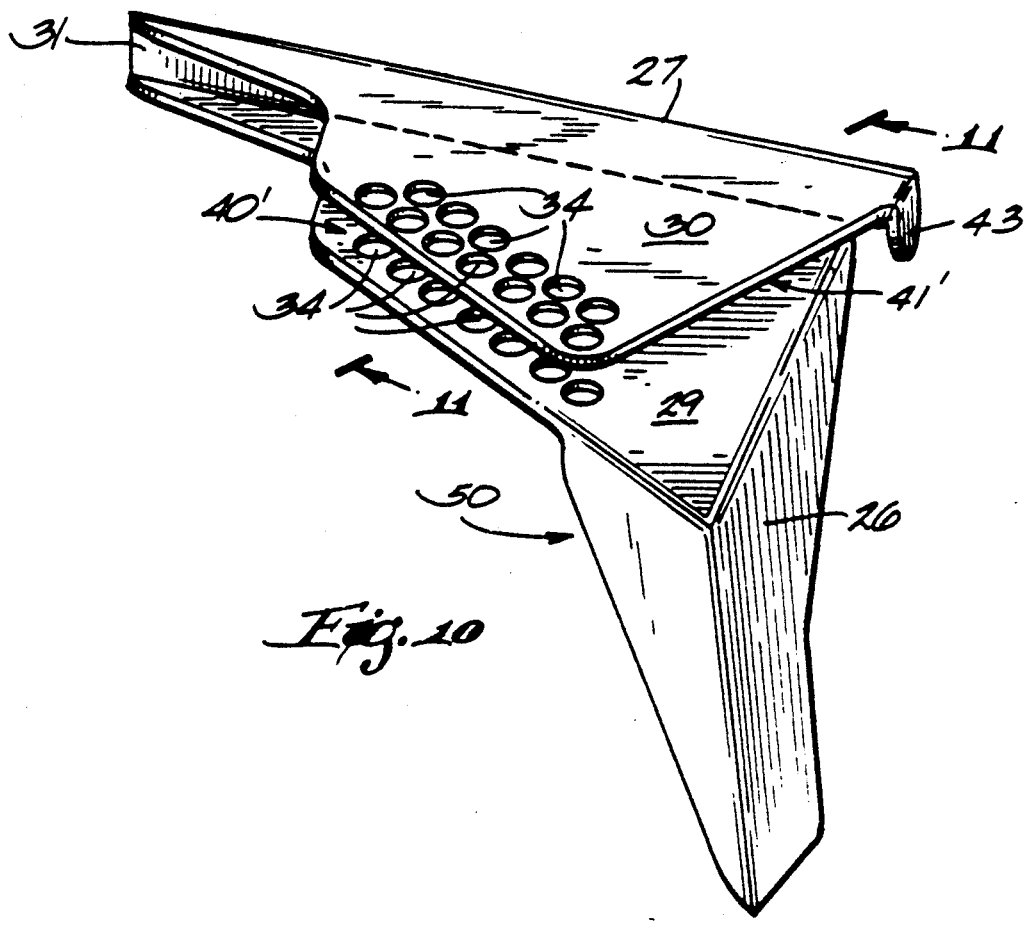
FIG. 10 is a perspective view of a second lockout device of the invention.

FIG. 1 illustrates a valve 10, such as a ball valve, gate valve or butterfly valve, which is installed on a pipeline 11 carrying a fluid source of energy to a machine or other piece of equipment. Typically, pipeline 11 will carry compressed air, hydraulic fluid or water as a source of power in the illustrated installation.

Valve 10 has a lever handle 12 which can be rotated between a closed position illustrated in full line in FIG. 1 to shut off the flow of fluid through pipeline 11, and an open position shown in dashed line in FIG. 1 to allow flow of fluid through the pipeline. Valve handle 12 includes an inboard horizontal panel 13 pivotally attached at 14 to the body 15 of the valve. An inclined intermediate panel 16 extends upwardly at an angle from panel 13 of the handle, and an outboard horizontal panel 17 extends from inclined intermediate panel 16. Inboard horizontal panel 13 includes an ear 18 that contacts stop 19 of the valve body when the valve is closed and an ear 20 that contacts stop 19 when the valve is open.

An operator grasps outboard horizontal panel 17 of the handle 12 to actuate the valve between its open and closed positions. Panel 17 is shown as including a plastic cover 21 in the drawings, which is included on some valves of this type. Handle 12 is made as a unitary structure incorporating the three panels 13, 16 and 17 as integral elements, most generally comprising a metal stamping of the appropriate configuration.

A lockout device 25 of the present invention designed for use with valve 10 is illustrated alongside the valve in FIG. 1. The lockout device 25 comprises two principal elements: a leg member 26 and a channel member 27 which extends at an angle from the top of the leg member. Leg member 26 includes a bearing surface 28 that is to contact the body of a valve, such as body 15 of valve 10, or the pipeline to which a valve is connected, such as pipeline 11, when the device 25 is installed on the handle of a lever type valve. Lockout device 25 can be made of molded plastic or metal, and dimensioned so as to accept several different sizes of handles; also, the device can be made available in several sizes, each intended to work with a range of valve sizes.

Channel member 27 of the lockout device comprises a horizontal bottom wall 29 (shown in section in FIGS. 2 and 5), a horizontal top wall 30 spaced from the bottom wall, a long side wall 31 extending between the bottom and top walls on one side of the channel member and a short side wall 32 extending between the bottom and top walls on the opposite side (also shown in section in FIG. 5).

Top wall 30 of the channel member of lockout device 25 includes a raised section 33 along one side thereof, and two rows of apertures 34 are defined in section 33 that extend through the top and bottom walls of channel member 27. The array of apertures 34 is arranged at an angle along the channel member, for the reason described later. Apertures 34 are to be of a size appropriate to receive the hasp of a lock that will be installed on the lockout device to lock valve handle 12 in a closed position when the device is fully installed.

Turning now to the sectional view of FIG. 2, the top wall 30, bottom wall 29 and side walls 31 and 32 of channel member 27 form the boundaries of a channel 40 in which the handle 12 of the valve will be inserted when the lockout device is applied to the valve. At the entrance 41 to the channel 40, the front surface 42 of bottom wall 29 is inclined rearwardly from its lower edge at an angle approximating the angle of inclination of intermediate member 16. A pivot block 43 is formed at the corner of the entrance 41 of channel 40 along sidewall 31 and includes an inclined surface 44 parallel to and spaced from front surface 42 of the bottom wall. The inclined intermediate panel 16 of the valve handle 12 will be between surfaces 42 and 44 of the bottom wall and pivot block respectively when lockout device 25 is installed on the valve handle. Inclined surfaces 42 and 44 of the bottom wall and pivot block define the entrance 41 to channel 40.

Lockout device 25 is inserted onto handle 12 of the valve in the manner illustrated in FIGS. 3–6. Starting with FIG. 3, device 25 is inserted onto handle 12 with the handle extending through channel 40 of the channel member 27. Lockout device 25 is then slid along the handle towards the valve until inclined front surface 42 contacts intermediate panel 16 of the valve handle 12. After this initial step, handle 12 of the valve is at an angle to long sidewall 31 of device 25 as shown in FIGS. 3 and 4 so that bearing surface 28 of the device clears the body 15 of the valve and pipeline 11. Inclined intermediate panel 16 of the handle is positioned along the inclined front surface 42 of the bottom wall.

Next, referring now to FIGS. 4 and 5, lockout device 25 is then shifted sideways until intermediate panel 16 of the valve handle is positioned between inclined surface 44 of pivot block 43 and the underlying portion of front surface 42 of the bottom wall (see also FIG. 8). The arrangement of the lockout device relative to the valve handle and valve after completion of this step is shown in plan view in FIG. 5 with the top wall of the channel member removed to more clearly illustrate this condition.

Turning now to FIG. 6, the operator grasps the end of handle 12 of the valve extending beyond top wall 30 at the outboard end of lockout device 25 and the sidewall 31 between his or her fingers. Device 25 is then pivoted relative to handle 12, until bearing surface 28 contacts the valve body or pipeline, a sufficient number of degrees counterclockwise as shown in FIG. 6, in the direction of arrow A, to apply a load against the handle and in a position in which an aligned pair of apertures 34 in top wall 30 and bottom wall 29 of the channel member are clear of but adjacent an edge of the handle in the desired position, as shown by aligned apertures 34a. The arrangement of the valve handle 12 and lockout device 25 after the completion of this step is illustrated in plan view of FIG. 6. Depending upon the size of the valve 15, device 25 may be rotated until the handle is parallel to or contacting side wall 31 of the channel member. The operator then inserts the hasp 45 of a lock 46 between the aligned apertures 34 in order to lock device 25 and handle 12 together in the final position.

FIG. 7 is a view of lockout device 25 in the final condition when loaded against handle 12 and the device is locked in place, in which only the handle 12 of the valve is shown in cross section to more clearly illustrate this condition. FIG. 8 is a side view illustrating the fully installed and locked position of lockout device 25 on handle 12 of the valve. The valve handle is now locked in its closed position; the valve handle can be opened by unlocking lock 46 and removing lockout device 25 from the handle of the valve.

The array of apertures 34 is arranged at an angle relative to the axis of handle 12 when the handle is in its closed position. This enables the lockout device 25 to be rotated a selected number of degrees relative to the handle in its closed position with bearing surface 28 contacting the valve body or pipeline and to be held tightly in place against the valve handle when a lock is inserted through an aligned pair of apertures. The lockout device then fits tightly about the handle, or applies a load to it, so that the handle is securely held in its closed position. The specific angle between the axis of the array of apertures 34 and the axis of handle 12 in its closed position will vary with the size or width of valve handles that a specific lockout device is designed to accommodate. During the development of the present invention, we have tested lockout devices in which the array of apertures was arranged at about 30° to the axis of a valve handle and devices in which the array was arranged at an angle of about 45° to the axis of the handle, the array of apertures being arranged at an obtuse angle relative to the valve body in both instances.

EXAMPLE 1

A prototype lockout device 25 was made, which is to be manufactured of molded plastic material for use with small to intermediate size valves having a handle in the range of about ⅜ inch to 1⅛ inch wide. The channel member of the lockout device was about 3 inches long along its long side wall 31. An array of apertures 34 arranged in two rows of four apertures each extending through the top and bottom walls of the channel member was arranged at an angle of about 40° relative to a valve handle in its closed position. A lockout device of this configuration was tested to be suitable for locking out handles of valves that were in the range of ⅜ inch to 1⅛ inch wide and provided about plus or minus 10° of rotation for each handle within this size range.

A useful optional accessory for lockout device 25 is illustrated in FIG. 9. In event lockout device 25 is to be used with a lever handle valve that has a longer handle than that effectively accommodated by the device, an extension member can be fastened to bearing surface 28 of the leg of the device. As shown in FIG. 9, extension member 48 is fastened to bearing surface 28, such as with a screw or other appropriate fastener. This enables intermediate section 16 of long valve handle 12' shown in FIG. 9 to be received within entrance 41 of channel 40 of the channel member 27, even though, as can be seen by comparison of FIG. 9 to FIG. 8, the inboard horizontal panel 13' of handle 12' is longer than inboard horizontal panel 13 of valve handle 12 in FIG. 8.

Figure 11:
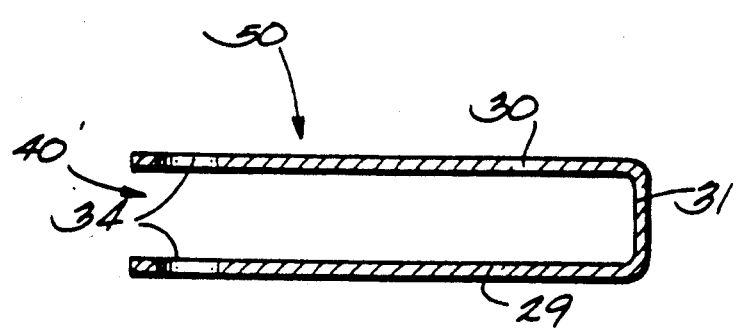
FIG. 11 is a sectional view along the plane of line 11—11 of FIG. 10.

A second lockout device 50 made according to the present invention is illustrated in FIGS. 10 and 11. Structural elements of device 50 that are the same or similar to corresponding elements of first lockout device 25 are identified by the same reference numerals used above.

Lockout device 50 was designed to be made of metal stampings. For example, one stamping can be employed to form the leg 26 of the device and a second stamping made to form the channel member 27 of the device, and the two stampings welded together to form the complete device. Also, however, the lockout device 50 can be made as a single metal stamping if so desired.

Channel member 27 of lockout device 50 includes a bottom wall 29, top wall 30 and long side wall 31; however, the channel member does not have a short side wall 32 as in the first embodiment. This construction defines a three-sided channel 40' in which the handle of a valve will be received when the lockout device is installed. Pivot block 43 is shown in the form of metal tab bent downwardly from 25 top wall 30 at the corner of entrance 41' to the channel adjacent side wall 31. Also, the entrance 41' to channel 40° does not have inclined surfaces 42 and 44 as in the first lockout device 25. A three-sided channel 40' works well with a metal lockout device whereas a four-sided channel 40 is considered preferable in the case of a molded plastic device.

EXAMPLE 2

A prototype lockout device 50 was made comprising a steel stamping for its leg member 26 and a second steel stamping for the channel member 27 which were welded together. Side wall 31 of the device was about 6" long. The device was designed to accommodate larger size valves having lever handles in the range of about 1 inch to 1½ inches wide. The array of apertures 34 formed in the top and bottom walls of the channel member was arranged at about 45° to the axis of a valve handle when in its closed position. This allowed for rotation of plus or minus 15° of the lockout device about each of the handles within this size range and provided for the device to be rotated firmly against an edge of a handle for locking it in the closed position.

The foregoing detailed description is made by reference to several specific embodiments of a valve lockout device according to the present invention for use in locking a lever handle valve in its closed position. The embodiments are intended as illustrative, and not limiting, and it is anticipated that those of ordinary skill in the art will be able to devise modifications to the described embodiments that will remain within the scope of the invention.

We claim:

1. A lockout device for use with a valve of the type having a valve body for connection to a pipeline and a lever handle rotatable between an open position and a closed position, the lever handle including (a) an inboard horizontal panel pivotally attached to the valve body, (b) an outboard horizontal panel, and (c) an inclined intermediate panel extending at an angle between the inboard and outboard panels, said lockout device comprising, in combination:

(1) a leg member having upper and lower portions, with a bearing surface along the lower portion of the leg member adapted to bear against the valve body or a pipeline connected to the valve body;

(2) a channel member extending from the upper portion of the leg member at an angle to the bearing surface and including spaced top and bottom walls and at least one side wall defining a channel including an entrance for receiving the inclined intermediate panel of a lever valve handle;

(3) pivot block means at a corner of the entrance to the channel and about which the lockout device is rotatable relative to a lever valve handle extending through the channel; and (4) aperture means extending through the top wall and bottom wall of the channel member for receiving a hasp of a lock in engagement with an edge of a lever valve handle extending through the channel.

2. A lockout device for use with a valve of the type having a valve body for connection to a pipeline and a lever handle rotatable between an open position and a closed position, the lever handle including (a) an inboard horizontal panel pivotally attached to the valve body, (b) an outboard horizontal panel, and (c) an inclined intermediate panel extending at an angle between the inboard and outboard panels, said lockout device comprising, in combination:

(1) a leg member having a bearing surface adapted to contact the valve body or pipeline connected to the valve body;

(2) a channel member extending from the leg member and including a channel arranged at an angle to the bearing surface of the leg member adapted to receive the lever handle of the valve and engage the inclined intermediate panel thereof when the handle is in its closed position; and (3) an array of aligned spaced pairs of apertures extending through the channel member arranged at an angle to the handle in its closed position;

said device being pivotable about the lever handle in its closed position to hold the handle closed with the bearing surface of the leg member in contact with the valve body or pipeline and an aligned pair of apertures along an edge of the handle to receive a lock to lockout the valve handle.

3. A lockout device for use with a valve of the type having a valve body for connection to a pipeline and a lever handle rotatable between an open position and a closed position, the lever handle including (a) an inboard horizontal panel pivotally attached to the valve body, (b) an outboard horizontal panel, and (c) an inclined intermediate panel extending at an angle between the inboard and outboard panels, said lockout device comprising, in combination:
(1) a leg member having upper and lower portions, with a bearing surface along the lower portion of the leg member adapted to bear against the valve body or a pipeline connected to the valve body;
(2) a channel member extending from the upper portion of the leg member at an angle to the bearing surface and including spaced top, bottom and side walls defining a channel therebetween, the bottom wall having an inclined front surface,
the inclined front surface of the bottom wall and a facing edge of the top wall defining an entrance to the channel;
(3) a pivot block at a corner of the entrance to the channel having an inclined surface spaced from and parallel to the inclined front surface of the bottom wall of the channel member; and
(4) an array of apertures extending through the top wall and bottom wall of the channel member, the apertures being arranged in aligned pairs with each aperture in the top wall aligned with an aperture in the bottom wall, whereby a lever valve handle extending through the channel of the member with its intermediate panel between the front surface of the bottom wall and the inclined surface of the pivot block is locked in the closed position by a lock with a hasp extending through an aligned pair of apertures in the top and bottom walls of the channel member and bearing against an edge of the handle.

* * * * *